(12) United States Patent
Abe et al.

(10) Patent No.: US 7,779,706 B2
(45) Date of Patent: Aug. 24, 2010

(54) CABLE-TYPE LOAD SENSOR

(75) Inventors: Tomiya Abe, Hitachi (JP); Yasuyuki Hishida, Hitachi (JP); Satoshi Yamamoto, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/356,816

(22) Filed: Jan. 21, 2009

(65) Prior Publication Data

US 2009/0183578 A1 Jul. 23, 2009

(30) Foreign Application Priority Data

Jan. 23, 2008 (JP) .............................. 2008-012804

(51) Int. Cl.
*G01L 1/22* (2006.01)
(52) U.S. Cl. ................................. 73/862.627
(58) Field of Classification Search ............. 73/862.627
See application file for complete search history.

(56) References Cited

U.S. PATENT DOCUMENTS

| | | | | |
|---|---|---|---|---|
| 5,742,559 | A * | 4/1998 | Marschall et al. ............. | 367/20 |
| 6,122,431 | A * | 9/2000 | Abe et al. .................... | 385/145 |
| 6,534,999 | B2 * | 3/2003 | Brown ........................ | 324/543 |
| 6,606,914 | B2 * | 8/2003 | Kume .......................... | 73/849 |
| 6,777,947 | B2 * | 8/2004 | McCoy et al. ................ | 324/449 |
| 7,202,674 | B2 * | 4/2007 | Nakano et al. ............... | 324/661 |
| 7,256,347 | B2 * | 8/2007 | Gustavsson ................ | 174/74 R |
| 7,414,416 | B2 * | 8/2008 | Watkins et al. .............. | 324/693 |
| 7,534,957 | B2 * | 5/2009 | Yamaura et al. ............. | 174/36 |
| 2002/0020223 | A1 * | 2/2002 | Kume .......................... | 73/763 |
| 2002/0079905 | A1 * | 6/2002 | Brown ........................ | 324/543 |
| 2005/0268734 | A1 * | 12/2005 | Watkins, Jr. et al. .......... | 73/866 |
| 2009/0133994 | A1 * | 5/2009 | Yasuda et al. ............. | 200/61.43 |
| 2009/0183579 | A1 * | 7/2009 | Abe ...................... | 73/862.627 |

FOREIGN PATENT DOCUMENTS

| | | |
|---|---|---|
| JP | 63-290922 | 11/1988 |
| JP | 2769754 | 4/1998 |
| JP | 3354506 | 9/2002 |
| JP | 3731475 | 10/2005 |

\* cited by examiner

*Primary Examiner*—Lisa M Caputo
*Assistant Examiner*—Freddie Kirkland, III
(74) *Attorney, Agent, or Firm*—Mattingly & Malur, P.C.

(57) ABSTRACT

A cable-type load sensor having an advantage in layout and being capable of sensing the load precisely is provided. The cable-type load sensor comprises a linear member composed of electrically conductive rubber and having a hollow part extending in the longitudinal direction at the central part of the cross section, and a cladding layer composed of the same kind of rubber material as the linear member and covering the circumference on the linear member.

6 Claims, 4 Drawing Sheets

CABLE-TYPE LOAD SENSOR

TECHNICAL FIELD

The present invention relates to a cable-type load sensor.

BACKGROUND ART

In conventional load sensors, a typical electrical sensor includes a pressure sensor (cord switch) 91, for example, illustrated in FIG. 9. The pressure sensor 91 detects the load by way of the internal conductors 92 contacting to each other upon the external load applied.

In other types of load sensor, there are generally used such a method that the load is sensed by an accelerator sensor or a strain gauge, or such a method that the load is sensed by the modulated intensity of light inside the optical fiber caused by the flexural loss and compression loss of the optical fiber.

In the above methods, as the used electrical processing circuits and the light sensing and emitting apparatus are complex, their detection accuracy and noise tolerance are low, and thus, there has never been a good solution for providing low-cost, downsized and high-precision sensors.

In addition to the above methods, there was provided such a load sensor using conducting rubbers that has a simple structure and operates with a simple principle.

Prior art related to the present invention is disclosed in JP 2769754 B, JP 63-290922 A, JP 3731475 B, and JP 3354506 B.

SUMMARY OF INVENTION

JP 2769754 B, JP 63-290922 A, and JP 3731475 B refer to the method in which a conductive rubber is provided between sheet-type electrodes and the pressure is detected by sensing the change in the bearing force, which may enable to detect the pressure applied on the sheet geometry but has a restriction on the bending direction in the sheet geometry and thus, it would therefore be desirable to develop cable-type load sensors having an advantage in layout is needed.

JP 3354506 B refers to a sensor having an advantage in layout which uses a cable-type pressure sensor as illustrated in FIG. 9, which only provides the signal representing the contact state or the non-contact state, leading to such a problem that it is difficult to discriminate the intensity of load.

An object of the present invention is to solve the above problems and to provide a cable-type load sensor having an advantage in layout and being capable of sensing the load precisely.

{Means for Solving the Problems}

To achieve the above object, a cable-type load sensor according to one aspect of the present invention comprises a linear member composed of electrically conductive rubber and having a hollow part extending in the longitudinal direction at the central part of the cross section, and a cladding layer composed of the same kind of rubber material as the linear member and covering the circumference on the linear member.

Preferably, in the above-mentioned cable-type load sensor, a buckling prevention member is provided further at the hollow part.

Preferably, in the above-mentioned cable-type load sensor, the rubber material is composed of silicone rubber or ethylene-propylene rubber having volume elasticity modulus between $10^5$ Pa and $10^8$ Pa.

Preferably, in the above-mentioned cable-type load sensor, the electrically conductive rubber is composed of the rubber material filled with electrically conductive filler.

Preferably, in the above-mentioned cable-type load sensor, the electrically conductive filler is carbon black or metallic fine particle.

According to the present invention, it will be appreciated that a high-precision and low-cost cable-type load sensor having an advantage in layout and having less mechanical deterioration can be obtained.

BRIEF DESCRIPTION OF THE DRAWINGS

FIG. 1 is a cross-sectional view of the cable-type load sensor according to the present invention.
FIG. 2 is a schematic diagram of the load measurement system composed of the cable-type load sensor of FIG. 1 connected to the electrical resistance measurement part.
FIG. 3 is a cross-sectional view of the cable-type load sensor illustrating one modification of the present invention.
FIG. 4 is a cross-sectional view of the cable-type load sensor illustrating one modification of the present invention.
FIG. 5 is a cross-sectional view of the cable-type load sensor illustrating one modification of the present invention.
FIG. 6 is a characteristic chart showing the characteristic (the relation between the load and the electrical resistance) of the cable-type load sensor of FIG. 1.
FIG. 7 is a characteristic chart showing the characteristic (between the time period after the load is released and the electrical resistance) of the cable-type load sensor of FIG. 1.
FIG. 8 is a characteristic chart showing the characteristic (the relation between the load and the electrical resistance) of the pressure sensor of FIG. 9.
FIG. 9 is a cross-sectional view of the conventional pressure sensor.

DESCRIPTION OF EMBODIMENTS

The preferred embodiment of the present invention will now be described with reference to attached drawings.

Figure 1:
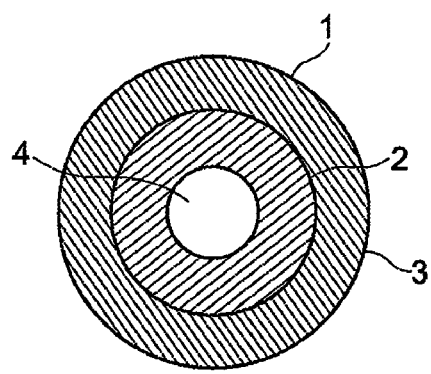
{FIG. 1}

FIG. 1 is a vertical cross-section of a cable-type load sensor illustrating one embodiment of the present invention.

As illustrated in FIG. 1, the cable-type load sensor 1 of this embodiment has a linear member 2 having elasticity and electrical conductivity, and a cladding layer 3 having elasticity and covering the circumference of the linear member 2.

The hollow part (air space) 4 is formed in the longitudinal direction at the central part of the cross section of the linear member 2. The linear member 2 and the cladding layer 3 are formed as the almost concentric circles projected onto the cross-sectional view.

The linear member 2 is composed of electrically conductive rubber composed of the rubber material filled with electrically conductive filler.

As for the rubber material, it is preferred that the rubber material to be used has a restoring force and a mechanical characteristic allowing large deformation as well as smaller change in the volume elasticity modulus even in a wide range of operating temperature. More specifically, it is preferable to use silicone rubber or ethylene-propylene rubber which has smaller change in the volume elasticity modulus (hardness) under operation from low temperature to high temperature.

In addition, the elasticity characteristic (volume elasticity modulus) of the rubber material may be preferably between $10^5$ Pa and $10^8$ Pa. This is because the production of the rubber material may be difficult if the elasticity characteristic of the rubber materials is less than $10^5$ Pa, and because the rubber elasticity may be lost and the restoring characteristic may be depleted if the elasticity characteristic of the rubber materials is larger than $10^8$ Pa.

As for the electrically conductive filler, it is preferable to use carbon black or metallic particle such as nickel, copper and silver. Preferably, carbon black which is low cost and has smaller specific weight may be used, in which metallic particles may be dispersed easily in the rubber matrix forming the rubber material and may be highly contacted to the rubber matrix forming the rubber material.

It is preferable to specify the electric resistivity of the linear member to be between 0.5 Ωcm and 100 Ωcm. This is because the fraction of the electrically conductive filler filled inside the rubber material becomes excessive and thus the rubber elasticity may be lost and the restoring characteristic may be depleted if the electric resistivity is less than 0.5 Ωcm, and because the electrical resistance becomes too high and thus the measurement for load detection becomes difficult if the electric resistivity is larger than 100 Ωcm.

Generally, rubber materials with electrical conductivity have lower elasticity (that is, hard and a narrowed range in the elasticity deformation). The cladding layer 3 having an excellent characteristic in elasticity in which the electrically conductive filler is not filled may be contacted (bonded) to the linear member 2 so that the shape of the linear member 2 may be restored more definitely. For example, the cladding layer 3 may be bonded to the linear member 2 by extrusion cladding of the cladding layer 3 onto the circumference of the linear member 2. As for bonding the cladding layer 3 to the linear member 2, any adhesive material may be used alternately.

As for the cladding layer 3, it is preferable to use materials composed of the rubber material having the same kind of chemical structure as the linear member 2 from the viewpoint of adhesive property to the linear member 2. This is because the same kind of chemical structure in the rubber materials makes it easy for both of the cladding layer 3 and the linear member 2 to form molecular level mixtures at their bonding interface, which leads to forming more definite bonding interface than the case using a different kind of chemical structures in rubber materials.

In this embodiment, the rubber materials for the linear member 2 and the cladding layer 3 are identical to each other. As for the rubber material used for the cladding layer 3, it is preferable to use silicone rubber or ethylene-propylene rubber having the elasticity characteristic between $10^5$ Pa and $10^8$ Pa. The cladding layer 3 may prevent the change in the electrical resistance of the linear member 2 caused by the direct contact between the linear member 2 and any external conductor in order to enable to measure precisely the change in the electrical resistance of the linear member 2 in response to the change in the applied load.

When measuring the load by using the cable-type load sensor 1 in this embodiment, the load measuring system 21 is formed by means that electrodes are connected to both terminals of the cable-type load sensor 1, respectively, and then those electrodes are connected to the electrical resistance measurement part 22.

The electrical resistance measurement part 22 detects the change in the electrical resistance of the linear member 2 in response to the load applied to the cable-type load sensor 1, and then estimates the load applied to the cable-type load sensor 1 based on the change in that electrical resistance.

Next, the operation of the cable-type load sensor 1 in this embodiment will be described below.

Electrical resistance R of the electric cable is generally known to be expressed in the formula (1), where L is the length of the conductor, A is the cross section and ρ is the specific volume resistance of the conductor.

$$R=\rho L/A \qquad (1)$$

The present invention uses this formula as the theory of load detection.

The load may be detected as the change in the electrical resistance R of the conductor induced by the changes in the length L and cross-section A of the conductor, both caused by the applied load. The length L of the conductor becomes longer and its cross-section A becomes smaller due to the load applied in the direction of its side face. This means that the electrical resistance R becomes larger when the load is applied in the direction of the side face.

The cable-type load sensor 1 in this embodiment uses the linear member 2 as the conductor, and thus, the applied load is detected based on the change in the electrical resistance of the linear member 2.

More specifically, when the load is applied to the side face of the cable-type load sensor 1, the cable-type load sensor changes its shape and then the linear member 2 change its shape. Then, the change in the shape of the linear member 2 leads to the changes in the length and cross-section of the linear member 2, and finally, the electrical resistance of the linear member 2 changes. The load applied to the cable-type load sensor 1 may be measured by detecting the change in this electrical resistance.

The effect of the present invention will now be described below.

In the cable-type load sensor 1 in this embodiment, the cladding layer 3 is formed at the circumference of the linear member 2, and the linear member 2 and the cladding layer 3 are bonded to each other.

For example, typical strain gauges amplify the slight change in the electrical resistance of the metallic resistor by using a bridge circuit. Though such strain gauges are very high precision device, as they have a very small sensor part, the resultant sensor apparatus become large and complex in case of detecting at arbitrary positions along the cable because it is required to layout strain gauges at those positions individually.

In the cable-type load sensor 1, it will be appreciated that load detection at arbitrary positions along the line (on the cable-type load sensor 1) may be enabled because it has such a simple structure as the cladding layer 3 is formed at the circumference of the linear member 2 and because there is no complex circuit.

In addition, as the cable-type load sensor 1 is shaped in a cable, it will be appreciated that the cable-type load sensor has no restriction on the bending direction, and thus has an advantage in layout.

In addition, as the linear member 2 and the cladding layer 3 are bonded to each other, the linear member 2 which has a depleted restriction characteristic due to the electrically conductive filler can be restored forcibly by the cladding layer 3, and then, the change in the shape of the linear member 2 can be restored definitely in response to the release of the applied load. It will be appreciated that the change in the shape of the linear member 2 may be prevented from being remained even when the applied load is released, and thus, its mechanical deterioration can be reduced.

In addition, the hollow part 4 is formed in the longitudinal direction at the central part of the cross section of the linear member 2 in the cable-type load sensor 1. Owing to this structure, it will be appreciated that the linear member 2 may change its shape easily in response to the load applied to the cable-type load sensor 1, which leads to the definite change in the shape of the linear member 2, and thus, the load can be detected precisely.

In addition, the linear member 2 and the cladding layer 3 are composed of the same rubber material in the cable-type load sensor 1. Owing to this structure, it will be appreciate that the bonding property between the linear member 2 and the cladding layer 3 can be increased and thus, their restoring characteristic can be further increased.

First modification example of this embodiment will now be described below.

Figure 3:
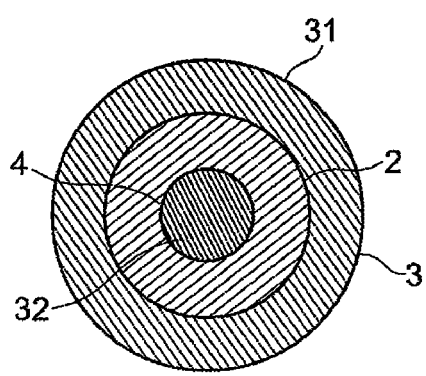
{FIG. 3}

As shown in FIG. 3, the cable-type load sensor 31 has basically the same structure as the cable-type load sensor 1 shown in FIG. 1, in which the buckling prevention member 32 is inserted at the hollow part 4. The cable-type load sensor 31 uses a plastic bar as the buckling prevention member 32.

Owing to the structure in which the buckling prevention member 32 is inserted at the hollow part 4, it will be appreciated that the buckling of the cable-type load sensor 31 can be prevented when bending and laying out the cable-type load sensor 31.

Second modification example of this embodiment will now be described below.

Figure 4:
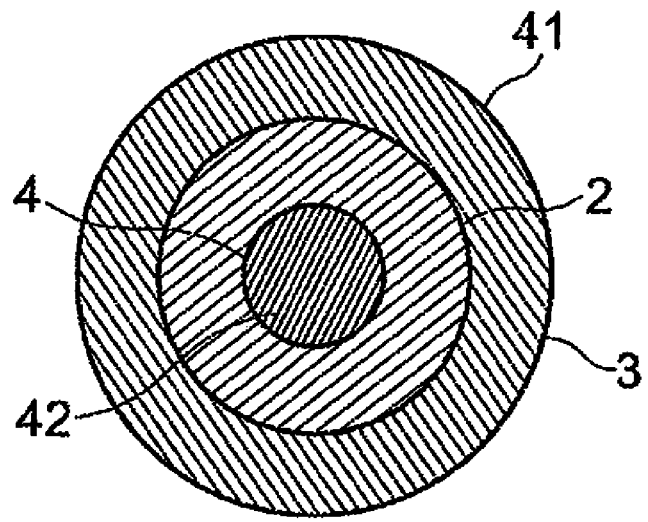
{FIG. 4}

As shown in FIG. 4, the cable-type load sensor 41 is so provided that the buckling prevention member 42 may be formed by filling the same rubber material as the cladding layer 3 at the hollow part 4 in the cable-type load sensor 1 shown in FIG. 1. Owing to the structure in which the buckling prevention member 42 is formed, it will be appreciated that the buckling of the cable-type load sensor 41 can be prevented when bending and laying out the cable-type load sensor 41.

Third modification example of this embodiment will now be described below.

Figure 5:
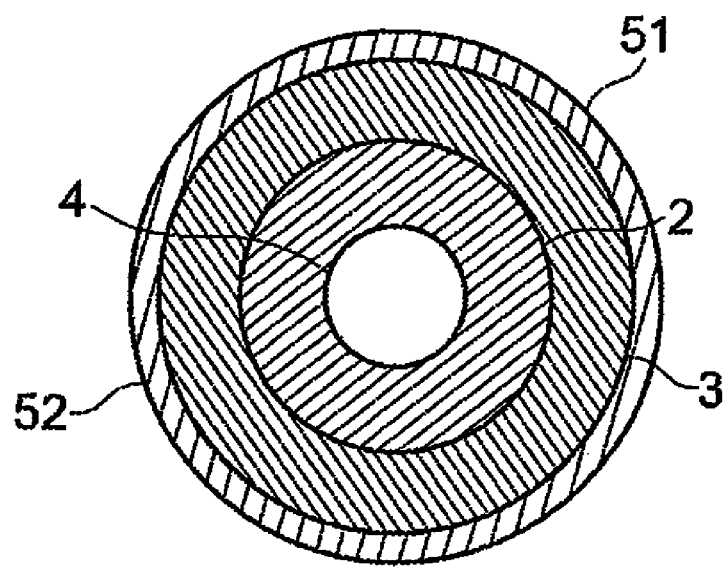
{FIG. 5}

As shown in FIG. 5, the cable-type load sensor 51 is so provided that the tape layer 52 may be formed by winding the tape composed of PET, PE (polyethylene) or PP (polypropylene) at the outermost layer of the cable-type load sensor 1 shown in FIG. 1, and that the cable-type load sensor 1 may be protected from the external damage. It is allowed in the cable-type load sensor 51 to provide the protection layer at the periphery of the cladding layer 3 by extrusion cladding of the material such as PE instead of forming the tape layer 52.

EMBODIMENT

The cable-type load sensor of FIG. 1 is produced by using the linear member 2 composed of the silicone rubber filled with carbon black and the cladding layer 3 composed of the same silicone rubber as used in the linear member 2, in which the electric conductivity of the linear member 2 is 0.7 Ωcm, the diameter of the hollow part 4 is 1.0 mm, the outside diameter of the linear member 2 is 3 mm and the outside diameter of the cladding layer 3 is 5 mm.

Figure 2:
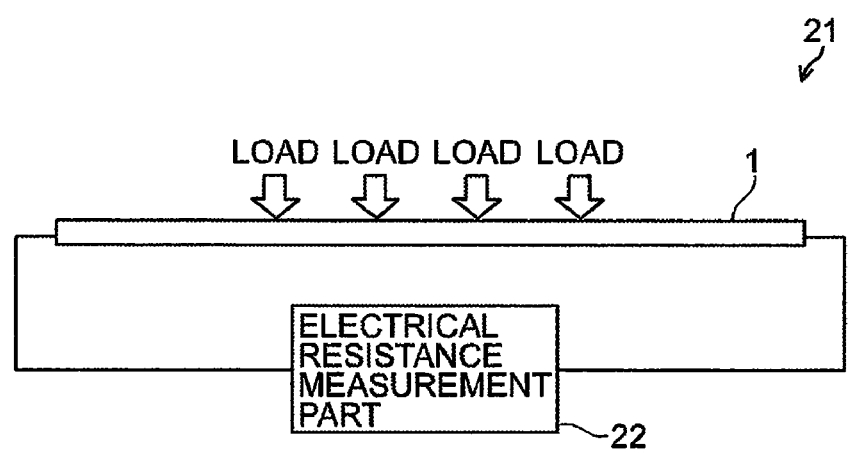
{FIG. 2}

The electrical resistance is measured in applying the load at the arbitrary parts, each having 10 mm length, on the cable-type load sensor 1, this measurement being by the load measurement system 21 of FIG. 2, which is formed by connecting the electrodes to both terminals of the cable-type load sensor 1, the length of which is 2 m, and then the both electrodes may be connected to the electrical resistance measurement part 22. The measurement results are shown in FIG. 6 and FIG. 7.

Figure 6:
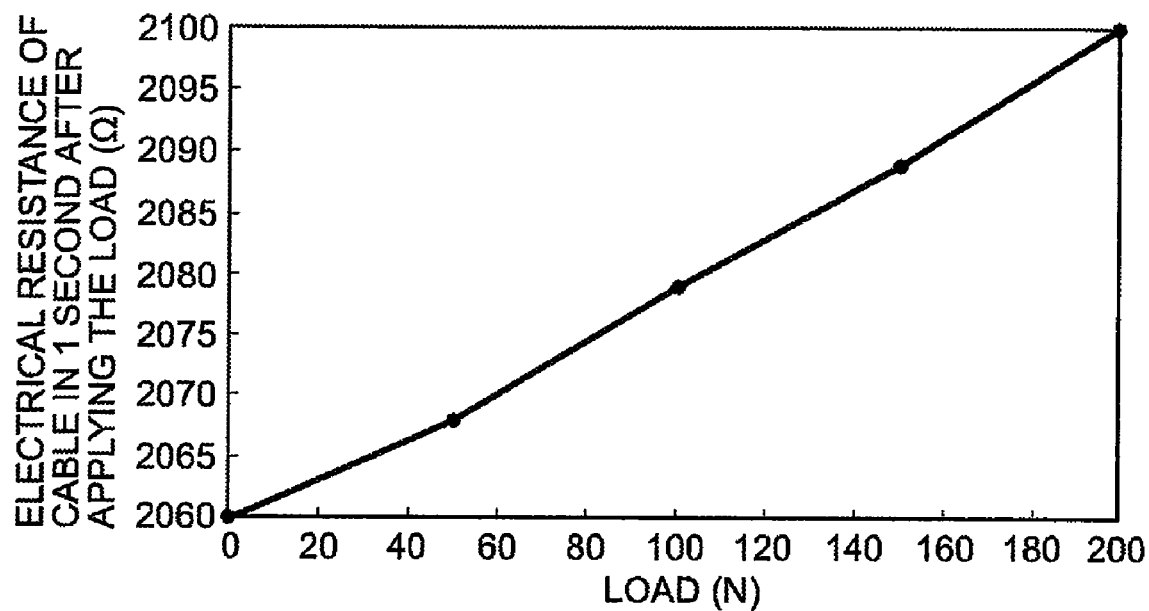
{FIG. 6}

As shown in FIG. 6, it is observed that the electrical resistance of the straight part 2 in the cable-type load sensor 1 increases as the applied load increases, and thus, it is proved that the cable-type load sensor functions properly as the load sensor and has an advantage in layout.

Figure 7:
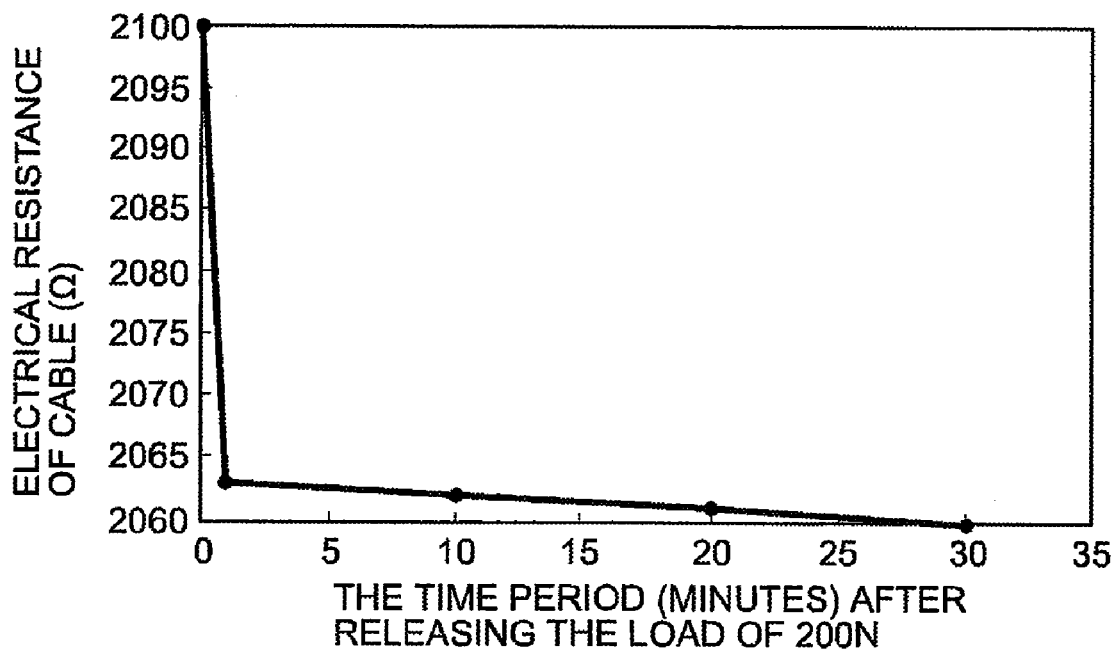
{FIG. 7}

As shown in FIG. 7, it is observed that the electrical resistance of the straight part 2 in the cable-type load sensor 1 recovers promptly after releasing the load of 200 N, and thus, it is proved that the cable-type load sensor has an excellent recovering characteristic as the load sensor.

Figure 8:
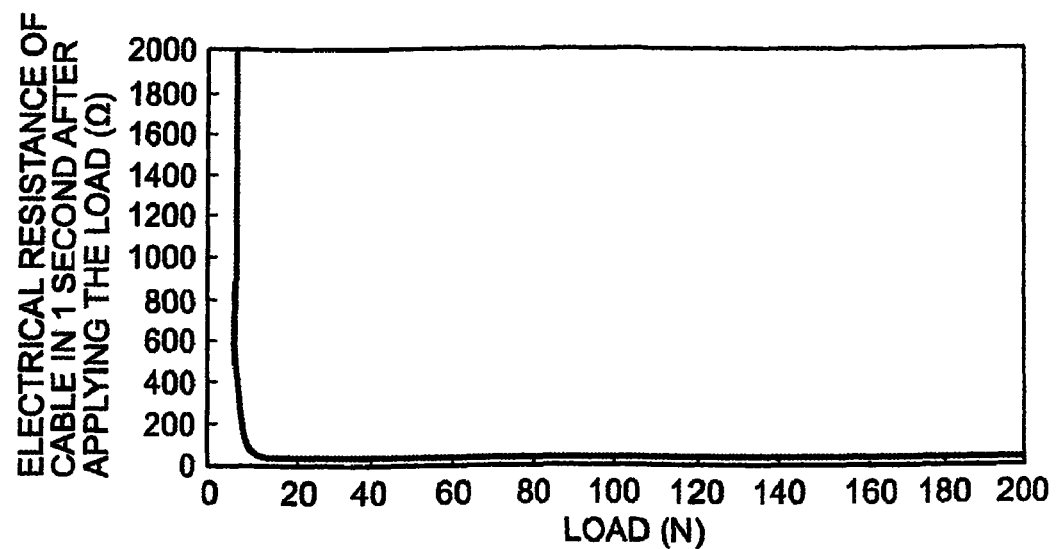
{FIG. 8}
Figure 9:
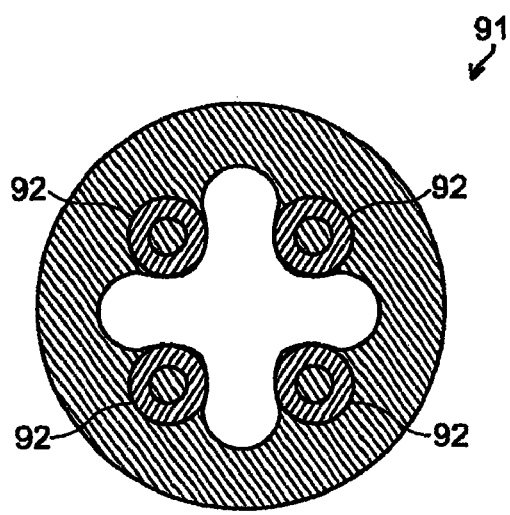
{FIG. 9}

In contrast, FIG. 8 illustrates the measurement result of the electrical resistance in using the conventional pressure sensor (cord switch) illustrated in FIG. 9 by the same measurement method as applied to the cable-type load sensor 1. It is observed that the conventional pressure sensor 91 has an excellent sensing capability for the applied load up to about 10 N, but that, as the applied load increases, the electrical resistance of the pressure sensor 91 does not change, and thus, it is proved that the conventional pressure sensor does not function properly as the load sensor.

The invention claimed is:

1. A cable-type load sensor comprising:
   a linear member composed of a rubber material filled with an electrically conductive filler and having a hollow part extending in a longitudinal direction at a central part of a cross section of said linear member, and
   a cladding layer composed of the same kind of rubber material as said linear member, having a higher volume elasticity modulus than said linear member and covering a circumference of said linear member,
   wherein said cable-type load sensor detects a load applied to said cable-type load sensor by measuring a change in an electrical resistance of said linear member in response to a change in the load.

2. The cable-type load sensor according to claim 1, wherein a buckling prevention member is provided in said hollow part.

3. The cable-type load sensor according to claim 2, wherein said rubber material is composed of silicone rubber or ethylene-propylene rubber having a volume elasticity modulus between $10^5$ Pa and $10^8$ Pa.

4. The cable-type load sensor according to claim 2, wherein said electrically conductive filler is carbon black or a metallic fine particle.

5. The cable-type load sensor according to claim 1, wherein said rubber material is composed of silicone rubber or ethylene-propylene rubber having a volume elasticity modulus between $10^5$ Pa and $10^8$ Pa.

6. The cable-type load sensor according to claim 1, wherein said electrically conductive filler is carbon black or a metallic fine particle.

* * * * *